(12) United States Patent
Oba et al.

(10) Patent No.: US 9,511,406 B2
(45) Date of Patent: Dec. 6, 2016

(54) METHOD OF PRODUCING IRON CORE

(71) Applicant: MITSUI HIGH-TEC, INC., Kitakyushu-shi, Fukuoka (JP)

(72) Inventors: Yukinori Oba, Fukuoka (JP); Takahiro Shimizu, Kitakyushu (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 14/552,877

(22) Filed: Nov. 25, 2014

(65) Prior Publication Data

US 2015/0075340 A1    Mar. 19, 2015

Related U.S. Application Data

(60) Continuation of application No. 11/786,810, filed on Apr. 13, 2007, now abandoned, which is a division of application No. 10/960,659, filed on Oct. 7, 2004, now abandoned.

(30) Foreign Application Priority Data

Oct. 10, 2003    (JP) ................. 2003-352313

(51) Int. Cl.
  *B21D 28/02*    (2006.01)
  *B21D 28/06*    (2006.01)
  *H02K 15/02*    (2006.01)

(52) U.S. Cl.
  CPC ............... *B21D 28/06* (2013.01); *B21D 28/02* (2013.01); *H02K 15/02* (2013.01); *Y10T 29/49009* (2015.01); *Y10T 83/0448* (2015.04); *Y10T 83/0481* (2015.04); *Y10T 83/0577* (2015.04); *Y10T 83/06* (2015.04); *Y10T 83/943* (2015.04); *Y10T 83/9425* (2015.04)

(58) Field of Classification Search
  CPC .................... H02K 15/02–15/03; B21D 28/22; B21D 28/02; B21D 28/06
  USPC .................... 83/40, 551, 552, 694, 687, 691
  See application file for complete search history.

(56) References Cited

U.S. PATENT DOCUMENTS

| | | |
|---|---|---|
| 1,942,043 A | 1/1934 | Anderson |
| 2,250,641 A | 7/1941 | Maddock |
| 2,986,329 A | 5/1961 | Tailleur |

(Continued)

FOREIGN PATENT DOCUMENTS

| | | |
|---|---|---|
| JP | 11-156455 | 6/1999 |
| JP | 2000-334523 | 12/2000 |

*Primary Examiner* — Kenneth E Peterson
(74) *Attorney, Agent, or Firm* — Greenblum & Bernstein, P.L.C.

(57) ABSTRACT

An iron-core producing method is provided that blanks iron cores from an iron strip by guiding the iron strip sequentially through an iron core-producing apparatus having a plurality of workstations. The method includes guiding, by a guide, the iron strip to a first workstation having a punch that intrudes into caulking portion-forming holes, and simultaneously forming, by the first workstation, first plural sets of caulking portions at a predetermined pitch in the iron strip. The method also includes guiding the iron strip from the first workstation to a second workstation within the iron-core producing apparatus, and forming, by the second workstation, a first iron core from the iron strip by blanking, such that tooth portions of the first iron core are disposed at lower sides of respective yoke portions.

14 Claims, 6 Drawing Sheets

(56) References Cited

U.S. PATENT DOCUMENTS

| | | | |
|---|---|---|---|
| 3,232,155 A | | 2/1966 | Davis |
| 3,854,355 A | | 12/1974 | Anefall |
| 4,210,041 A | | 7/1980 | Mitman et al. |
| 4,510,834 A | | 4/1985 | Greene et al. |
| 4,597,168 A | | 7/1986 | Oboshi et al. |
| 4,709,605 A | | 12/1987 | Clark |
| 4,914,934 A | * | 4/1990 | Fritzsche ................. H02K 1/16 29/596 |
| 5,211,095 A | | 5/1993 | Chun et al. |
| 5,986,377 A | * | 11/1999 | Yamada ................. H02K 1/148 310/216.013 |
| 6,024,225 A | | 2/2000 | Van der Donk et al. |
| 6,074,330 A | | 6/2000 | Ostini |
| 6,121,711 A | * | 9/2000 | Nakahara ................. H02K 1/14 242/432.3 |
| 6,675,688 B2 | | 1/2004 | Ostini |
| 2001/0011851 A1 | | 8/2001 | Asao et al. |
| 2001/0030483 A1 | * | 10/2001 | Masumoto ........... H02K 15/024 310/216.008 |
| 2003/0127937 A1 | * | 7/2003 | Kanno .................... H02K 1/24 310/261.1 |
| 2004/0056556 A1 | * | 3/2004 | Fujita ...................... H02K 1/06 310/216.044 |

* cited by examiner

METHOD OF PRODUCING IRON CORE

This application is a continuation of U.S. patent application Ser. No. 11/786,810, filed Apr. 13, 2007, now abandoned, which is a division of U.S. patent application Ser. No. 10/960,659, filed Oct. 7, 2004, now abandoned, which claims priority to Japanese Application No. 2003-352313, filed Oct. 10, 2003. The entire disclosures of the above-identified applications, including the specifications, drawings and claims are incorporated herein by reference in their entirety.

BACKGROUND OF THE INVENTION

This invention relates to a method of and an apparatus for producing an iron core.

An iron core for a motor is formed from a strip by blanking. This iron core is usually blanked as a substantially linear iron core.

This linear iron core comprises a plurality of magnetic pole pieces which are interconnected into a linear configuration by interconnecting portions, each magnetic pole piece comprising a yoke portion, and a tooth portion.

A plurality of such iron cores are stacked and laminated together, and thereafter windings are wound around the stacks of tooth portions, respectively, and the interconnecting portions are bent so as to form the laminated iron core assembly into an annular shape, thereby producing a core (stator) of a motor (see, for example, JP-A-11-156455).

For producing the above substantially-linear iron core, there is conventionally used an iron core-producing apparatus which comprises guide means for guiding the strip linearly in one direction, a punch for blanking an iron core from the strip, and a die located beneath the punch.

In such a conventional producing apparatus, when the strip is guided onto the die by the guide means, the punch is driven into the die, thereby blanking an iron core from the strip.

In this conventional producing apparatus, the punch and the die are disposed such that their longitudinal direction is parallel to the direction of the width of the strip. Therefore, in the blanking step, the iron core is blanked from the strip in such a manner that the longitudinal direction of the iron core is disposed parallel to the direction of the width of the strip (see, for example, JP-A-11-156455).

In the production of the conventional iron core, the iron core is blanked, with its longitudinal direction disposed parallel to the direction of the width of the strip, and therefore in order to increase the overall length of the iron core, it has been necessary to increase the width of the strip.

And besides, in the conventional iron core-producing apparatus, the punch and the die are disposed in such a manner that their longitudinal direction is parallel to the direction of the width of the strip as described above. Therefore, when the width of the strip is increased in order to increase the overall length of the iron core, a strip conveyance width of the guide means must be increased in accordance with the increased width of the strip; otherwise, the iron core cannot be conveyed, and therefore can not be produced. In addition, unless a longitudinal width of a blanking drop hole, formed in the die, is increased according to the width of the strip, the iron core can not be produced from the strip by blanking.

In order to thus increase the overall length of the iron core, there have been encountered problems that the width of the strip must be increased and that the whole of the iron core-producing apparatus becomes large in size.

When the whole of the iron core-producing apparatus becomes large in size, it is required to use a pressing device of a large size, which has been very disadvantageous.

SUMMARY OF THE INVENTION

In view of the above circumstances, it is an object of this invention to provide an iron core-producing method and an iron core-producing apparatus which are capable of producing an iron core of a large overall length without the need for increasing a width of a strip and without the use of an iron core-producing apparatus of a large size.

The above object has been achieved by an iron core-producing method of the invention for blanking a substantially linear iron core from a strip, comprising at least the step of blanking the iron core from the strip in such a manner that a longitudinal direction of the iron core is inclined relative to a direction of a width of the strip.

An iron core-producing apparatus of the invention for blanking a substantially linear iron core from a strip, comprises at least a punch disposed such that its longitudinal direction is inclined relative to a direction of a width of the strip, and a die which is provided beneath the punch, and is disposed such that its longitudinal direction is inclined relative to the direction of the width of the strip.

The iron core-producing method of the invention comprises at least the step of blanking the iron core from the strip in such a manner that the longitudinal direction of the substantially linear iron core is inclined relative to the direction of the width of the strip. Therefore, the iron core, having an overall length larger than the width of the strip, can be produced without the need for increasing the width of the strip. And besides, when producing this iron core, it is not necessary to use a large-size producing apparatus since the width of the strip is not increased.

The iron core-producing apparatus of the invention is designed to blank the substantially linear iron core from the strip, and comprises at least the punch disposed such that its longitudinal direction is inclined relative to the direction of the width of the strip, and the die which is provided beneath the punch, and is disposed such that its longitudinal direction is inclined relative to the direction of the width of the strip. Therefore, the iron core, having an overall length larger than the width of the strip, can be produced without the need for increasing the width of the strip. And besides, when producing this iron core, it is not necessary to use a large-size producing apparatus since the width of the strip is not increased.

DETAILED DESCRIPTION OF THE PREFERRED EMBODIMENTS

One preferred embodiment of the present invention will now be described in detail with reference to the drawings.

Figure 1:
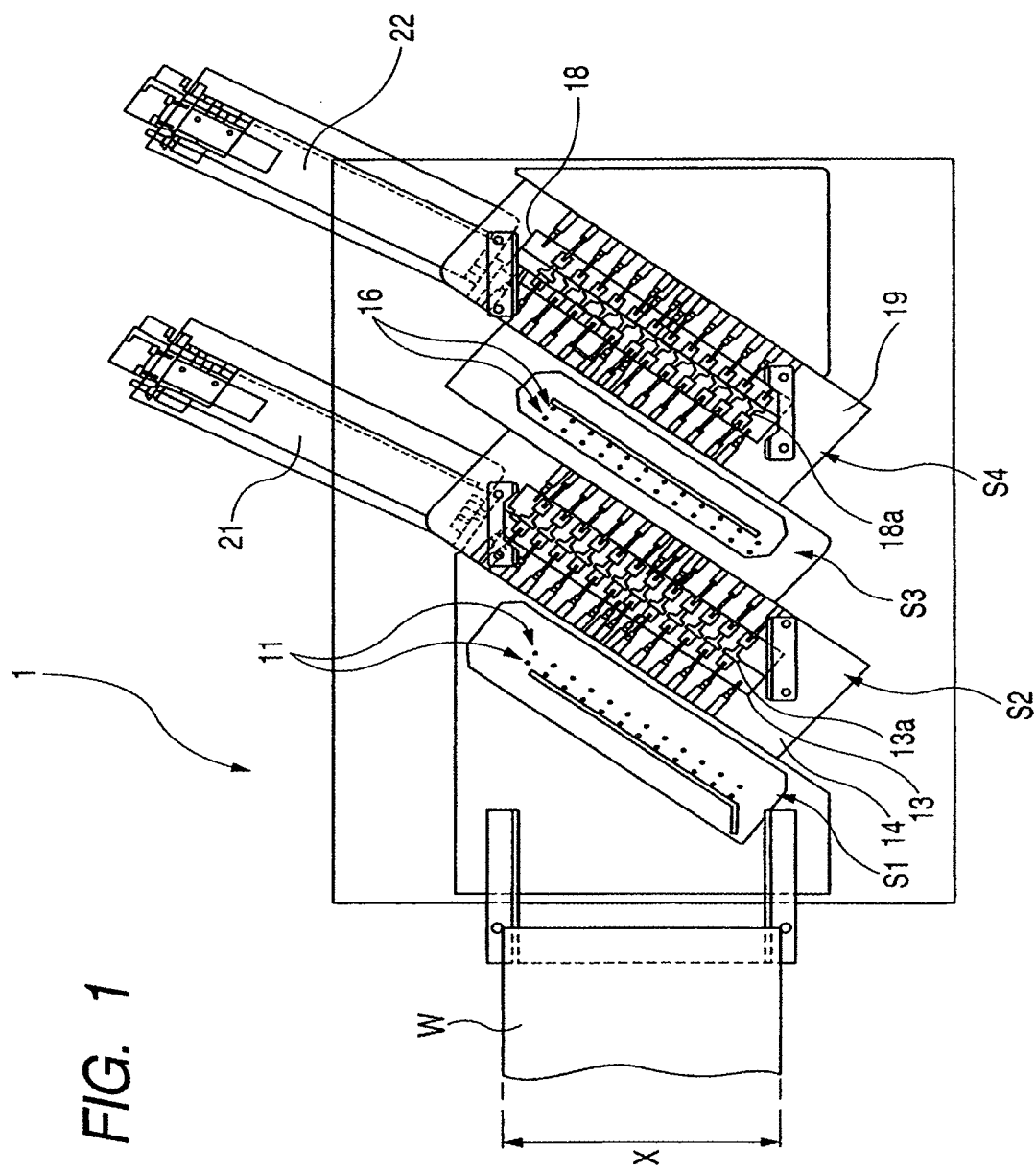
FIG. 1 is a conceptual top plan view of an iron core-producing apparatus of the present invention.
Figure 2:
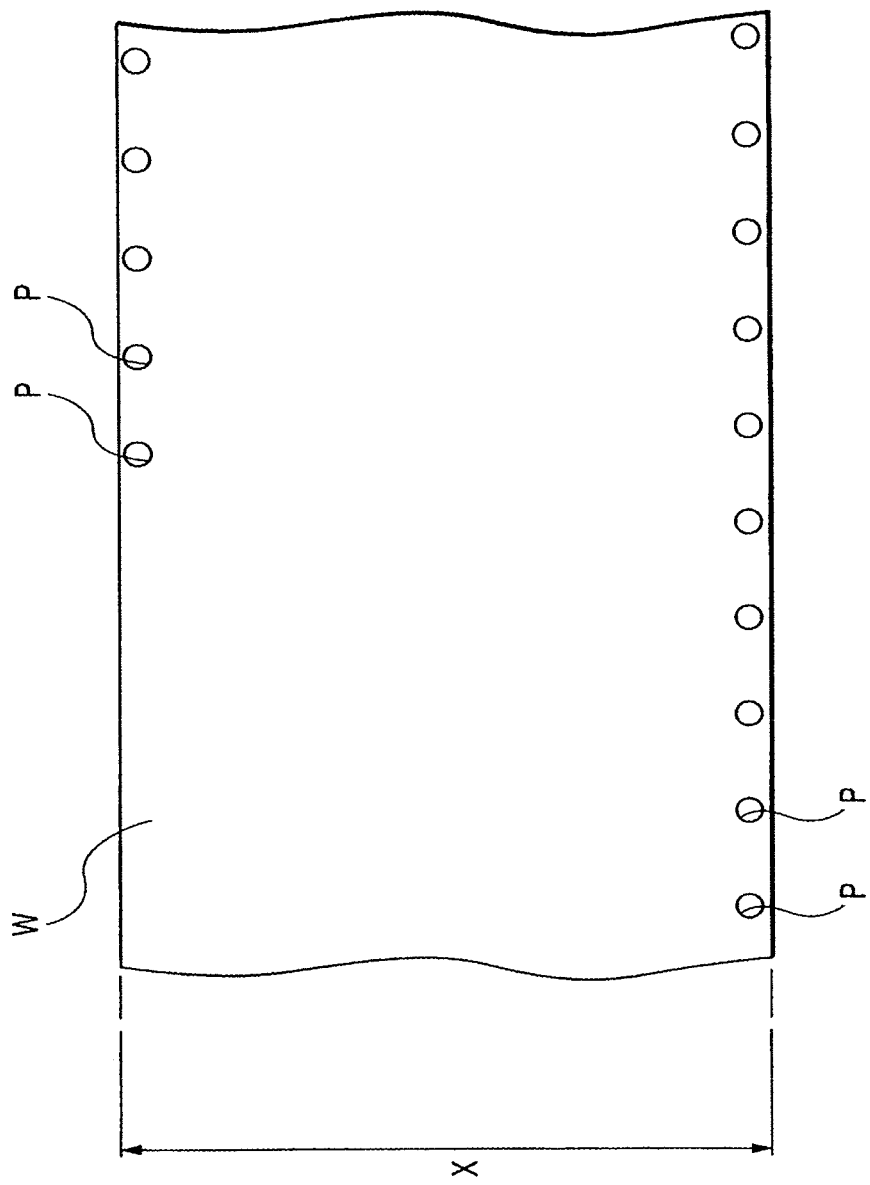
FIG. 2 is a conceptual top plan view of a strip W used in the producing apparatus of FIG. 1.
Figure 3:
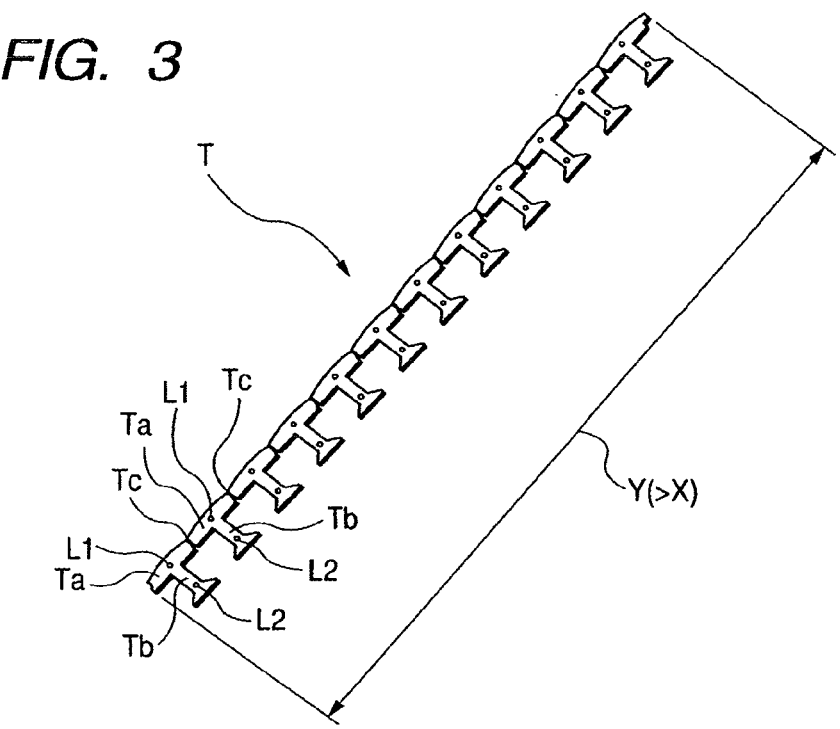
FIG. 3 is a conceptual top plan view of an iron core T produced at Station S2 of the producing apparatus of FIG. 1.

FIG. 1 is a conceptual top plan view of an iron core-producing apparatus (hereinafter referred to merely as "producing apparatus") of the invention. FIG. 2 is a conceptual top plan view of a strip W used in the producing apparatus of FIG. 1. FIG. 3 is a conceptual top plan view of an iron core T produced at Station S2 (described later) of the producing apparatus of FIG. 1.

The iron core-producing apparatus 1 of FIG. 1 forms the substantially linear iron core T of FIG. 3 from the strip of W of FIG. 2 by blanking.

As shown in FIG. 3, the iron core T thus blanked from the strip W has a longitudinal extent, indicated by the dimension Y, and includes a plurality of magnetic pole pieces each having a discrete "T" shape interconnected by interconnecting portions Tc, each of the magnetic pole pieces comprising a yoke portion Ta, and a tooth portion Tb formed on and projecting from the yoke portion Ta. The interconnected pole pieces collectively extend along a line that is inclined relative to the width (W) of the strip. Each tooth portion Tb and yoke portion Ta projecting therefrom cooperatively define the discrete "T" shape. The discrete "T" shapes are interconnected through the portions Tc. The yoke portions Ta are connected to each other to define a straight length with a width that is locally reduced at the interconnection portions.

The iron cores T are sequentially stacked one upon another and bound together by caulking in such a manner that caulking portions, formed in the magnetic pole pieces of each iron core T, are fitted respectively in the caulking portions of the preceding iron core T in the step of blanking the iron core T. Windings are wound respectively around the stacks of tooth portions Tb of the multiplicity of laminated iron cores T, and the interconnecting portions Tc each has a width less than a width of a yoke portion Ta at a location where the interconnecting portion Tc and yoke portion Ta are joined to allow the iron cores T to be bent at the interconnecting portions Tc so as to form the laminated iron cores T into an annular shape, thereby producing a core of a motor.

The producing apparatus 1 of FIG. 1 is provided with guide means/structure M for guiding the strip W in a predetermined manner in a longitudinal direction thereof.

This guide means includes engagement projections (not shown) for engagement in pilot holes P formed at a predetermined pitch in opposite side edge portions (spaced from each other in the direction of the width) of the strip W (FIG. 2). A leading end portion of the strip W is taken up through the engagement of the engagement projections in the pilot holes P, so that the strip W is guided sequentially to Stations S1 to S4.

The strip W is sequentially processed at Stations S1 to S4.

At Station S1, the caulking portions L1 and the caulking portions L2 (FIG. 4) are formed in the strip W.

Caulking portion-forming holes 11 for simultaneously forming the caulking portions L1 and the caulking portions L2 in the iron core T are provided at Station S1. A longitudinal direction of rows of caulking portion-forming holes 11 is inclined at an angle A (described later) relative to the direction X of the width of the strip W.

At Station S2, the iron core T (serving as a product) is formed from the strip W by blanking.

A die 13 and a die holder 14 for fixing the die 13 are provided at Station S2.

A blanking drop hole 13a is formed in the die 13, and extends in a longitudinal direction thereof. A longitudinal direction of the blanking drop hole 13a is inclined at the angle A relative to the widthwise direction X of the strip W.

A product take-out device 21 is provided below the blanking drop hole 13a. This product take-out device 21 comprises a conveyor belt (not shown) whose longitudinal direction is inclined relative to the widthwise direction of the strip W.

At Station S2, the iron core T is blanked in such a manner that the tooth portions Tb of the iron core T are disposed at lower sides of the respective yoke portions Ta as shown in FIG. 3.

Figure 6:
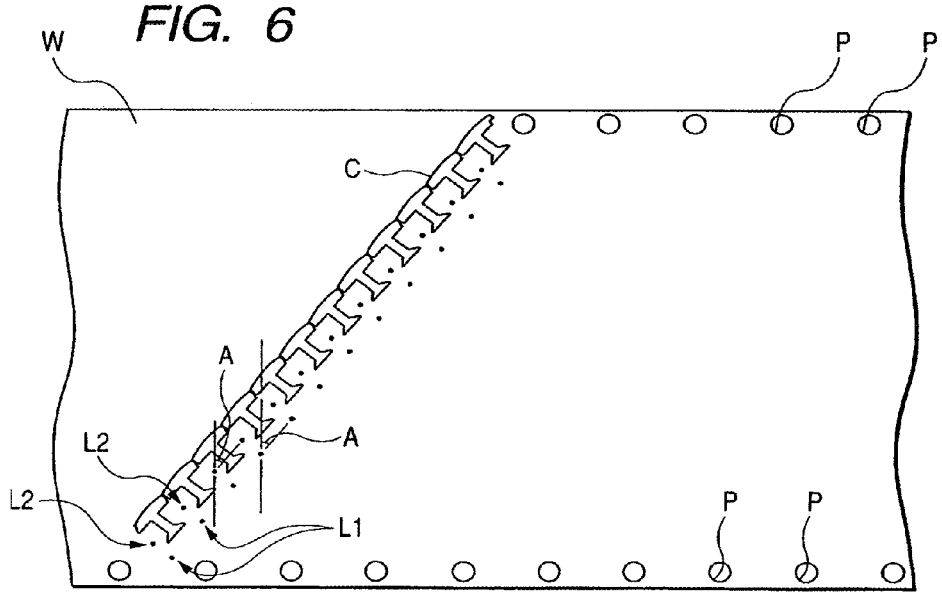
FIG. 6 is a conceptual top plan view of the strip W, showing a condition in which caulking portions L1 and caulking portions L2 have been formed by stamping in the strip W of FIG. 5 at Station S3.

At Station S3 of FIG. 1, caulking portions L1 and caulking portions L2 (as shown in FIG. 6) are formed in the strip W (from which the iron core T has been blanked at Stations S1 and S2) in order to produce another (fresh) iron core T.

Caulking portion-forming holes 16 for simultaneously forming the caulking portions L1 and the caulking portions L2 are provided at this Station S3. A longitudinal direction of rows of caulking portion-forming holes 16 is inclined at the angle A relative to the widthwise direction X of the strip W.

The caulking portions L1 and L2, which are identical in configuration to the caulking portions L1 and L2 formed at Station S1, are formed by stamping at this Station S3. However, as shown in FIG. 6, the positions of the caulking portions L1 and L2 (formed at Station S3) relative to each other are reversed (inverted) with respect to the caulking portions L1 and L2 formed at Station S1.

At Stations S4 of FIG. 1, the fresh iron core T (serving as a product) is blanked from the strip W in which the caulking portions L1 and L2 have been formed at Station S3.

A die 18 and a die holder 19 for fixing the die 18 are provided at this Station S4.

A blanking drop hole 18A is formed in the die 18, and extends in a longitudinal direction thereof. A longitudinal direction of the blanking drop hole 18a is inclined at the angle A relative to the widthwise direction X of the Strip W.

Figure 7:
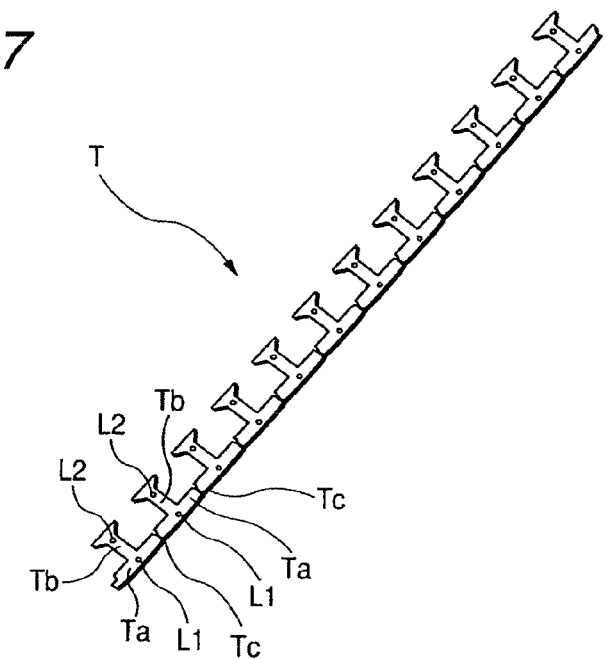
FIG. 7 is a conceptual top plan view of an iron core T produced at Station S4 of the producing apparatus of FIG. 1.

The iron core T, formed by blanking at Station S4, is identical in configuration, including length, to the iron core T formed by blanking at Station S2. However, at Station S4, the iron core T is blanked in such a manner that the tooth portions Tb of this iron core T are disposed at upper sides of the respective yoke portions Ta as shown in FIG. 7 (described later).

The process of producing the iron cores T from the strip W by the use of the above producing apparatus 1 will be described below in detail with reference to FIGS. 1 to 9.

Figure 4:
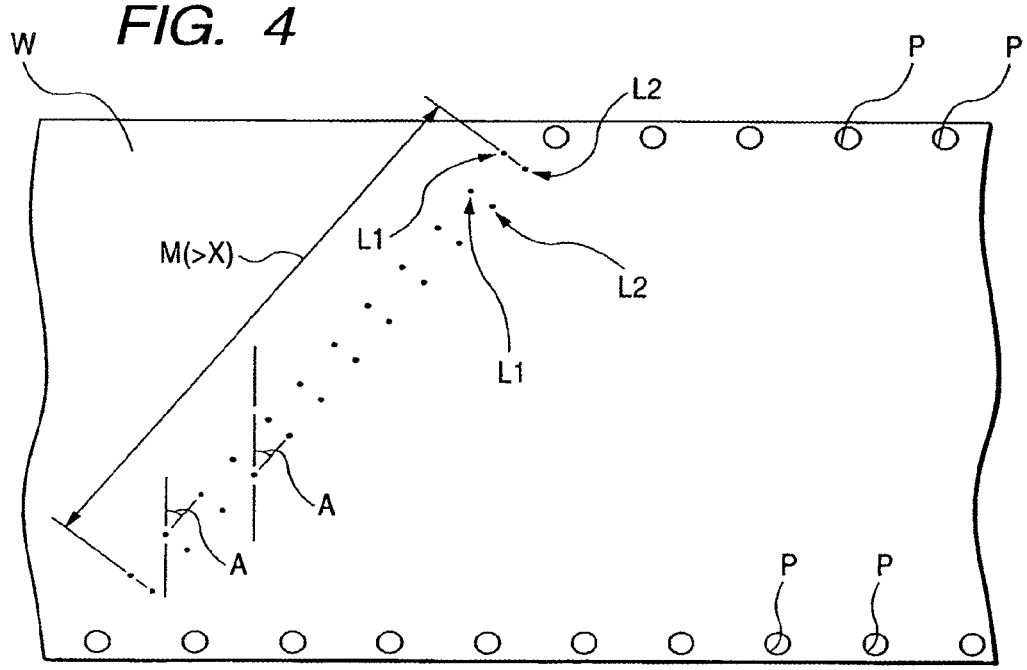
FIG. 4 is a conceptual top plan view showing the strip W in which a plurality of caulking portions L1 and a plurality of caulking portions L2 are formed by stamping at Station S1 of the producing apparatus of FIG. 1.

At Station S1 of FIG. 1, when the strip W of FIG. 2 is guided by the guide means to a position above the caulking portion-forming holes 11, a punch (not shown) intrudes into the caulking portion-forming holes 11 to simultaneously form the plurality of caulking portions L1 and the plurality of caulking portions L2 (FIG. 3) at a predetermined pitch as shown in FIG. 4.

FIG. 4 is a conceptual top plan view showing the strip W in which the plurality of caulking portions L1 and the plurality of caulking portions L2 are thus formed.

The caulking portions L1 as well as the caulking portions L2, formed in the strip W, correspond in number to the magnetic pole pieces of the iron core T (FIG. 3).

The row of caulking portions L1 as well as the row of caulking portions L2, are formed to be disposed in a direction inclined at the angle A (≠90°) relative to the widthwise direction of the strip W. It will be appreciated also from the arrangement of the thus formed caulking portions L1 and L2 that the longitudinal direction of the rows of caulking portion-forming holes 11, as well as the longitudinal direction of the punch for intruding into these holes 11, is inclined at the angle A (≠90°) relative to the widthwise direction of the strip W.

At Station S1, thus, the caulking portion-forming holes 11 and the punch for intruding into these holes 11 are so arranged that the longitudinal direction of the rows of caulking portion-forming holes 11, as well as the longitudinal direction of the punch for intruding into these holes 11, is inclined at the angle A (≠90°) relative to the widthwise direction of the strip W. Therefore, a longitudinal width M (see FIG. 4) of the rows of caulking portion-forming holes 11, as well as a longitudinal width M (see FIG. 4) of the punch for intruding into these holes 11, can be made larger than the width X of the strip W. Therefore, a distance M between the two caulking portions L1 disposed respectively at the opposite ends of the row of caulking portions L1, as well as a distance M between the two caulking portions L2 disposed respectively at the opposite ends of the row of caulking portions L2, can be made larger than the width X of the strip W (M>X) as shown in FIG. 4.

Figure 5:
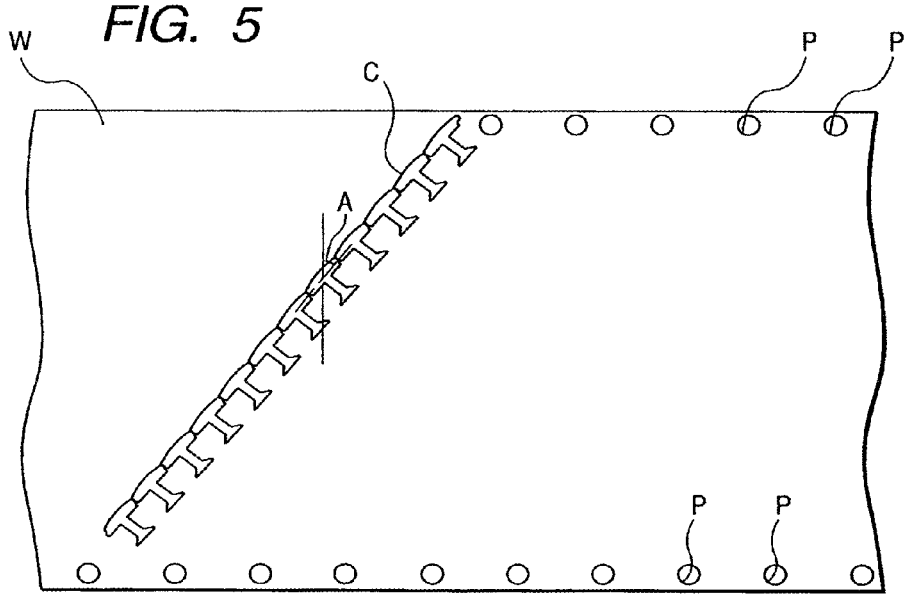
FIG. 5 is a conceptual top plan view of the strip W from which the iron core T has been blanked from the strip W at Station S2 of the producing apparatus.

Then, at Station S2 of FIG. 1, when the strip W is conveyed to a position above the blanking drop hole 13a in the die 13, a punch (not shown) intrudes into the blanking drop hole 13a to blank the iron core T of FIG. 3 from the strip W of FIG. 4. FIG. 5 is a conceptual top plan view of the strip W from which the iron core T of FIG. 3 has been blanked.

As shown in FIG. 3, the caulking portion L1 and the caulking portion L2 have been formed in each of the magnetic pole portions of the thus blanked iron core T.

On the other hand, a blanked-out hole C is formed in the strip W as a result of blanking of the iron core T as shown in FIG. 5. A longitudinal direction of the thus formed blanked-out hole C is inclined at the angle A (≠90°) relative to the widthwise direction of the strip W. It will be appreciated also from the manner of formation of this blanked-out hole C that the longitudinal direction of the blanking drop hole 13a, as well as the longitudinal direction of the punch for intruding into this hole 13a, is inclined at the angle A (≠90°) relative to the widthwise direction of the strip W.

At this Station S2, thus, the blanking drop hole 13a and the punch for intruding into this hole 13a are so arranged that the longitudinal direction of the blanking drop hole 13a, as well as the longitudinal direction of the punch for intruding into this hole 13a, is inclined at the angle A (≠90°) relative to the widthwise direction of the strip W. Therefore, a longitudinal width Y of the blanking drop hole 13a, as well as a longitudinal width Y of the punch for intruding into this hole 13a, can be made larger than the width X of the strip W (Y>X). Therefore, the overall length Y (see FIG. 3) of the blanked iron core T can be made larger than the width X of the strip W (Y>X).

At Station S3 of FIG. 1, when the strip W of FIG. 5 is guided by the guide means to a position above the caulking portion-forming holes 16, a punch (not shown) intrudes into the caulking portion-forming holes 16 to simultaneously form the caulking portions L1 and the caulking portions L2 as shown in FIG. 6.

FIG. 6 is a conceptual top plan view of the strip W, showing a condition in which the caulking portions L1 and the caulking portions L2 have been formed by stamping in the strip W of FIG. 5 at Station S3.

The caulking portions L1 as well as the caulking portions L2, formed in the strip W, correspond in number to the magnetic pole pieces of the iron core T (FIG. 7).

The row of caulking portions L1 as well as the row of caulking portions L2, are formed to be disposed in a direction inclined at the angle A (≠90°) relative to the widthwise direction of the strip w. It will be appreciated also from the arrangement of the thus formed caulking portions L1 and L2 that the longitudinal direction of the rows of caulking portion-forming holes 16, as well as the longitudinal direction of the punch for intruding into these holes 16, is inclined at the angle A (≠90°) relative to the widthwise direction of the strip W.

At Station S3, thus, the caulking portion-forming holes 16 and the punch for intruding into these holes 16 are so arranged that the longitudinal direction of the rows of caulking portion-forming holes 16, as well as the longitudinal direction of the punch for intruding into these holes 16, is inclined at the angle A (≠90°) relative to the widthwise direction of the strip W. Therefore, a longitudinal width M (see FIG. 4) of the rows of caulking portion-forming holes 16, as well as a longitudinal width M of the punch for intruding into these holes 16, can be made larger than the width X of the strip W. Therefore, a distance M (see FIG. 4) between the two caulking portions L1 disposed respectively at the opposite ends of the row of caulking portions L1, as well as a distance M (see FIG. 4) between the two caulking portions L2 disposed respectively at the opposite ends of the row of caulking portions L2, can be made larger than the width X of the strip W (M>X).

Figure 8:
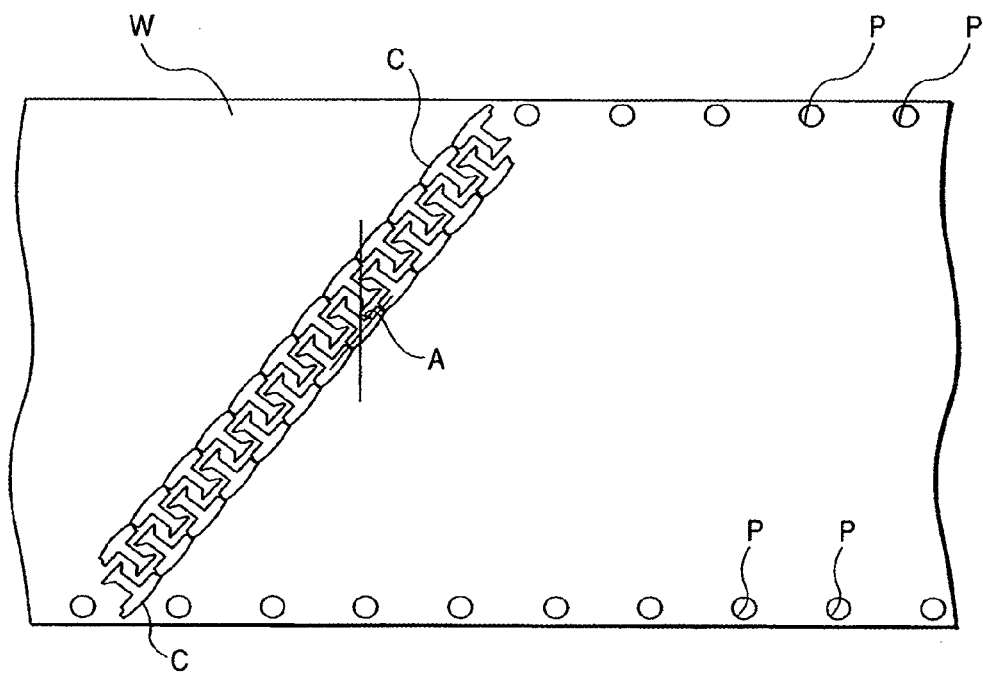
FIG. 8 is a conceptual top plan view of the strip W of FIG. 6 from which the iron core T of FIG. 7 has been blanked.

Then, at Station S4 of FIG. 1, when the strip W of FIG. 6 is conveyed to a position above the blanking drop hole 18a in the die 18, a punch (not shown) intrudes into the blanking drop hole 18a to blank the iron core T from the strip W of FIG. 6 as shown in FIG. 7. FIG. 7 is a conceptual top plan view of the iron core T formed at this Station S4. FIG. 8 is a conceptual top plan view of the strip W from which the iron core T of FIG. 7 has been blanked.

As shown in FIG. 7, the caulking portion L1 and the caulking portion L2 have been formed in each of the magnetic pole portions of the thus blanked iron core T.

A blanked-out hole C is formed in the strip W as a result of blanking of the iron core T as shown in FIG. 8. A longitudinal direction of the thus formed blanked-out hole C is inclined at the angle A (≠90°) relative to the widthwise direction of the strip W. It will be appreciated also from the manner of formation of this blanked-out hole C that the longitudinal direction of the blanking drop hole 18a, as well as the longitudinal direction of the punch for intruding into this hole 18a, is inclined at the angle A (≠90°) relative to the widthwise direction of the strip W.

At this Station S4, thus, the blanking drop hole 18a and the punch for intruding into this hole 18a are so arranged that the longitudinal direction of the blanking drop hole 18A, as well as the longitudinal direction of the punch for intruding into this hole 18a, is inclined at the angle A (≠90°) relative to the widthwise direction of the strip W. Therefore, a longitudinal width Y of the blanking drop hole 18a, as well as a longitudinal width Y of the punch for intruding into this hole 18a, can be made larger than the width X of the strip W (Y>X). Therefore, the overall length Y (see FIG. 3) of the blanked iron core T (FIG. 7) can be made larger than the width X of the strip (Y>X).

Two iron cores T of equal length can be produced by effecting the process of Stations S1 to S4. In this producing apparatus 1, a plurality of iron cores (two per process) can be produced from the strip W by repeating the process of Stations S1 to S4. At each of Stations S1 and S3, the caulking portions L1 and L2 are formed in the iron core T, and through holes are formed as the respective caulking portions L1 and L2 through the first (lowermost-layer) iron core T, while in each of the other iron cores T (that is, the second to uppermost-layer iron Cores T), the type of caulking portions (each of which assumes a caulking recess when viewed from one side of the iron core, and also assumes a caulking projection when viewed from the other side thereof) are formed as the respective caulking portions L1 and L2. At each of Stations S2 and S4, the iron core T is blanked from the strip, and moves through the blanking drop hole 13a, 18a into a position beneath the blanking drop hole 13a, 18a. At Station S4 at which an iron core T is first blanked, the iron core T, blanked at this time, is placed on the precedingly-produced iron core T, with its caulking projections fitted respectively in the through holes in the precedingly-produced iron core T, and the two iron cores T are laminated (stacked) and bound together by caulking. Thereafter, at each of Stations S2 and S4, a fresh iron core T is blanked, and is placed on the precedingly-stacked iron core T, with its caulking projections fitted respectively in the caulking recesses in this precedingly-stacked iron core T, and the fresh iron core T is laminated and joined onto the precedingly-stacked iron core T by caulking. This process is repeatedly carried out, so that the predetermined number of iron cores T are blanked, and are laminated and bound together by caulking.

Figure 9:
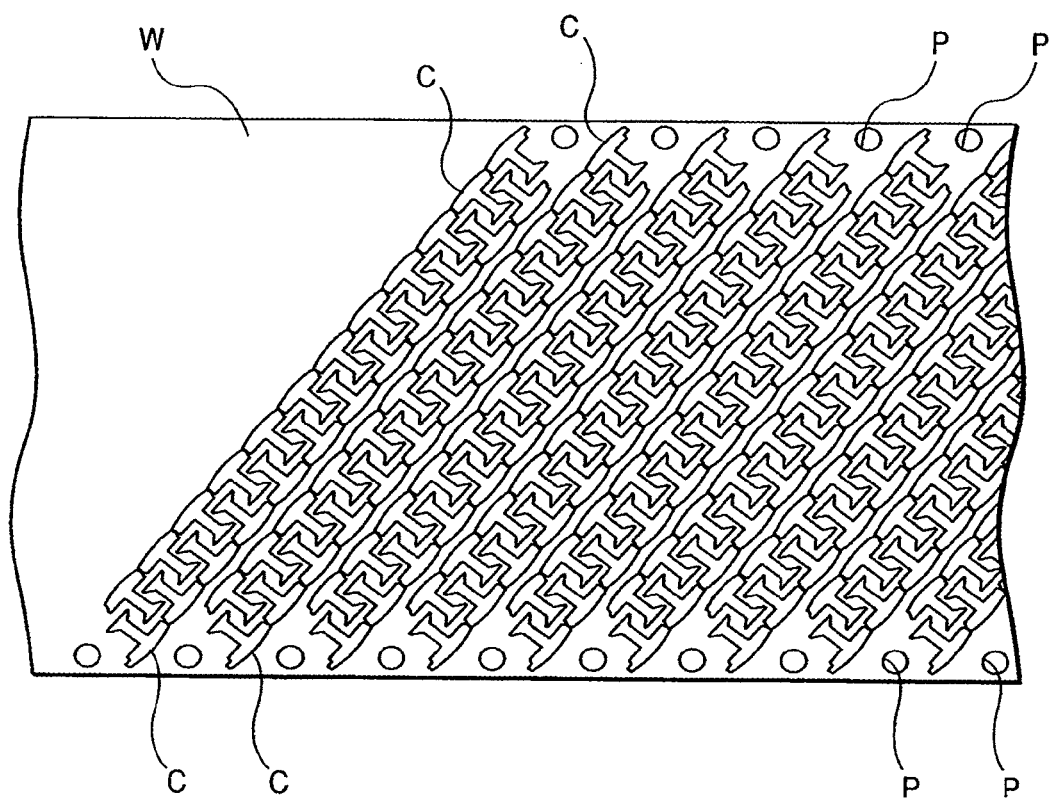
FIG. 9 is a conceptual top plan view of the strip W to which the process of Stations S1 to S4 has been repeatedly applied.

FIG. 9 is a conceptual top plan view of the strip W to which the process of Stations S1 to S4 has been repeatedly applied. As shown in FIG. 9, a plurality of rows of blanked-out holes C are formed in the strip W in parallel relation to one another.

The predetermined number of iron cores T, blanked and laminated by caulking at Station S2, are located on the product take-out device 21, and are discharged to the exterior of the producing apparatus 1 by the conveyor belt of the product take-out device 21.

The predetermined number of iron cores T, blanked and laminated together by caulking at Station S4, are located on the product take-out device 22, and are discharged to the exterior of the producing apparatus 1 by the conveyor belt of the product take-out device 22.

As described above, the method of the invention for producing the iron core T includes at least the step of blanking the substantially linear iron core T from the strip W in such a manner that the longitudinal direction of the iron core T is inclined relative to the widthwise direction of the strip W. Therefore, the iron core T, having the overall length Y larger than the width X of the strip W, can be produced, using the strip W having the conventional width X, that is, without the need for increasing the width X of the strip W.

In the case of increasing the overall length Y of the iron core T, the width X of the strip W does not need to be increased, and therefore it is not necessary that a strip guide width of the guide means should be increased in accordance with the width X of the strip W as in the conventional method, and also it is not necessary that the longitudinal width of the blanking drop holes 13a and 18a should be increased as in the conventional method.

Namely, when producing the iron core T having the large overall length, it is not necessary to increase the width W of the strip W, and therefore it is not necessary to use a large-size producing apparatus including the guide means with a large strip conveyance width, and the blanking drop holes with a large width.

This producing method can further includes the step of changing the angle A of inclination of each of the dies 13 and 18 and the angle A of each of the punches (for intruding respectively into the dies 13 and 18) in accordance with the overall length Y of iron cores to be produced, and by doing so, various iron cores of different overall lengths can be produced.

The producing apparatus 1 of the invention includes at least the punches each of which is provided for blanking the substantially linear iron core T from the strip W, and is disposed such that its longitudinal direction is inclined relative to the widthwise direction of the strip W as described above, and the dies 13 and 18 which are provided respectively beneath these punches, and are disposed such that their longitudinal directions are inclined relative to the widthwise direction of the strip W as described above. Therefore, the iron core T, having the overall length Y larger than the width X of the strip W, can be produced, using the strip W having the conventional width X, that is, without the need for increasing the width X of the strip W.

When increasing the overall length Y of the iron core, it is not necessary to increase the width W of the strip W, and therefore it is not necessary to use a large-size producing apparatus including the guide means with a large strip guide width, and the blanking drop holes 13a and 18a with a large longitudinal width as in the conventional apparatus.

Namely, when producing the iron core T with the large overall length, the width of the strip W does not need to be increased, and therefore it is not necessary to use such a large-size producing apparatus.

According to the present invention, the angle A of the inclination is set in a range from 20° to 70°, preferably in a range from 40° to 60°. Because the length Y of the iron core T can be represented by $Y=X/\cos A$, it is understandable that the length Y is lengthened 1.1× to 2.9×, preferably 1.3× to 2.0×.

This producing apparatus 1 can further includes means for changing the angle A of inclination of each of the blanking drop holes 13a and 18a and the angle A of each of the punches (for intruding respectively into the blanking drop holes 13a and 18a) in accordance with the overall length Y of iron cores T to be produced, and by doing so, various iron cores of different overall lengths can be produced.

Although the producing apparatus 1 of the above embodiment includes Stations S1 and S2 for producing one iron core T, and Stations S3 and S4 for producing another iron core T, this producing apparatus of the invention may include at least Stations S1 and S2 or Stations S3 and S4 for producing one iron core T.

Although the producing method of the invention produces a plurality of iron cores T, the invention can be applied to a method of producing one iron core T.

Although the above embodiment illustrates the iron core T of the winding core-type, the producing method and apparatus of the invention can be effectively applied to the cases where iron cores of various shapes are formed by blanking.

As described above, the iron core-producing apparatus of the invention is effectively used as a producing apparatus for producing an iron core serving as a part of a motor core and particularly for producing an iron core with a large overall length, and the iron core-producing method is effectively used as a method of producing this iron core.

What is claimed is:

1. An iron-core producing method that blanks iron cores from an iron strip by guiding the iron strip sequentially through an iron core-producing apparatus having a plurality of workstations such that a longitudinal direction of the iron cores is inclined relative to a direction of a width of the iron strip at an acute inclination angle, the method comprising:
   guiding, by a guide, the iron strip to a first workstation having a punch that intrudes into caulking portion-forming holes along a longitudinal direction of the iron strip;
   simultaneously forming, by caulking portion-forming holes and punches of the first workstation, first plural sets of caulking portions at a predetermined pitch in the iron strip, wherein a longitudinal direction of rows of the caulking portion-forming holes and the punches in the first workstation is inclined at an acute angle relative to the direction of the width of the iron strip;
   guiding the iron strip from the first workstation to a second workstation within the iron-core producing apparatus along the longitudinal direction of the iron strip;
   forming, by use of a die and a die holder that fixes the die provided at the second workstation, a first iron core from the iron strip by blanking, wherein a blanking drop hole is formed in the die of the second workstation that extends in a longitudinal direction and is included at the acute angle relative to the direction of the width of the iron strip;
   providing a third workstation;
   guiding the iron strip from the second workstation to the third workstation;
   providing, at the third workstation, a punch that intrudes into caulking portion-forming holes and that simultaneously forms second plural sets of caulking portions in the iron strip at the predetermined pitch in the iron strip;
   providing a fourth workstation;
   guiding the iron strip from the third workstation to the fourth workstation; and
   forming, at the fourth workstation, a second iron core by blanking from the iron strip in which the second plural sets of caulking portions were formed at the third workstation; and
   providing engagement projections in the guide that engages pilot holes formed at a predetermined pitch in opposite side edge portions of the iron strip,
   wherein the pilot holes in the opposite side edge portions of the iron strip are not directly opposite one another, and
   wherein a line that intersects the pilot holes on a first side portion of the iron strip also intersects the first iron core, and a line that intersects the pilot holes on a second side edge portion of the iron strip also intersects the second iron core.

2. The iron-core producing method of claim 1, the method further comprises:
   providing, at the second workstation, a product take-out device below the blanking drop hole, the product take-out device including a conveyor belt whose longitudinal direction is inclined relative to the direction of the width of the iron strip.

3. The iron-core producing method of claim 1, the method further comprising:
   inclining a longitudinal direction of rows of the caulking portion-forming holes in the third workstation at an acute angle relative to the direction of the width of the iron strip.

4. The iron-core producing method of claim 3, the method further comprising:
   reversing positions of the second plural sets of caulking portions formed at the third workstation relative to each other in an inverted configuration with respect to the first plural sets of caulking portions formed at the first workstation.

5. The iron-core producing method of claim 1, the method further comprising:
   providing a die and a die holder that fixes the die at the fourth workstation.

6. The iron-core producing method of claim 5, the method further comprising:
   forming, at the fourth workstation, a blanking drop hole in the die that extends in a longitudinal direction and is inclined at the acute angle relative to the direction of the width of the iron strip.

7. The iron-core producing method of claim 6, the method further comprising:
   providing, at the fourth workstation, a product take-out device below the blanking drop hole, the product take-out device including a conveyor belt whose longitudinal direction is inclined relative to the direction of the width of the iron strip.

8. The iron-core producing method of claim 1, the method further comprising:
   forming the second iron core, formed by blanking at the fourth workstation, identical in configuration to the first iron core formed by blanking at the second station, except the iron core formed at the fourth workstation is blanked in such a manner that tooth portions of the second iron core are disposed at upper sides of the respective yoke portions.

9. The iron-core producing method of claim 1, the method further comprising:
   forming the first iron core and the second iron core such that the first iron core and the second iron core each comprise a plurality of discrete, magnetic pole pieces joined by interconnecting portions that are bendable to form an annular shape.

10. The iron-core producing method of claim 9, further comprising:
    forming each magnetic pole piece such that each magnetic pole piece comprises a yoke portion and a tooth portion formed on and projecting from the yoke portion.

11. The iron-core producing method of claim 10, the method further comprising:
    forming the interconnecting portions such that the interconnecting portions have a width less than a width of yoke portions at locations where the interconnecting portions and yoke portions are joined to allow the first iron core and the second iron core to be bent into the annular shape.

12. The iron-core producing method of claim 1, the method further comprising:
    producing the first iron core and a second iron core from the iron strip such that the first iron core and the second iron core have lengths that are greater than the width of the iron strip.

13. The iron-core producing method of claim 1, the method further comprising:

inclining the longitudinal direction of the iron core in a range from 20 degrees to 70 degrees relative to a direction of a width of the iron strip.

14. The iron-core producing method of claim 1, the method further comprising:
inclining the longitudinal direction of the iron core in a range from 40 degrees to 60 degrees relative to a direction of a width of the iron strip.

* * * * *